No. 650,595. Patented May 29, 1900.
C. A. TAPLIN.
LAMP BURNER.
(Application filed Jan. 5, 1899.)

(No Model.)

Witnesses
A. W. Stipek
P. J. Egan

Inventor
Clarence A. Taplin,
By James Shepard
Atty.

THE NORRIS PETERS CO., PHOTO-LITHO., WASHINGTON, D. C.

UNITED STATES PATENT OFFICE.

CLARENCE A. TAPLIN, OF FORESTVILLE, CONNECTICUT, ASSIGNOR TO THE TAPLIN MANUFACTURING COMPANY, OF SAME PLACE.

LAMP-BURNER.

SPECIFICATION forming part of Letters Patent No. 650,595, dated May 29, 1900.

Application filed January 5, 1899. Serial No. 701,270. (No model.)

*To all whom it may concern:*

Be it known that I, CLARENCE A. TAPLIN, a citizen of the United States, residing at Forestville, in the county of Hartford and State of Connecticut, have invented certain new and useful Improvements in Lamp-Burners, of which the following is a specification.

My invention relates to improvements in lamp-burners; and the main object of my improvement is simplicity and economy in construction and to make the particular form of burner herein shown of tin instead of brass.

Figure 1:
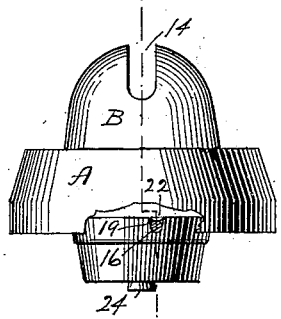
Figure 2:
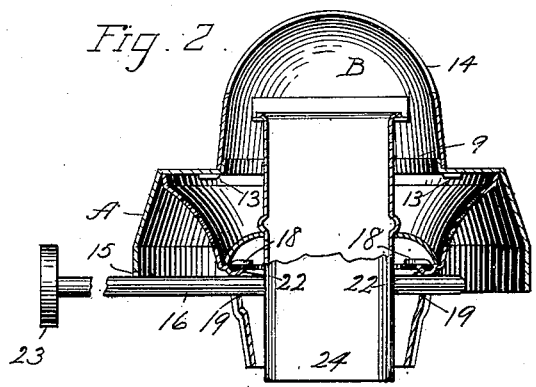
Figure 3:
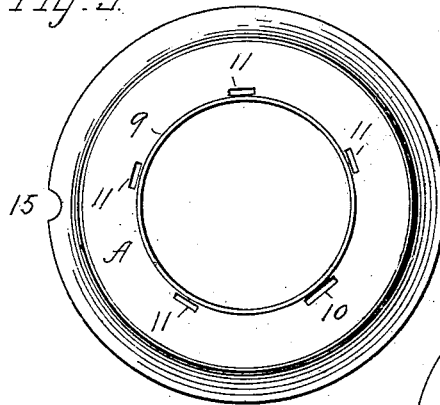
Figure 4:
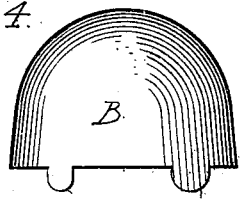
Figure 6:
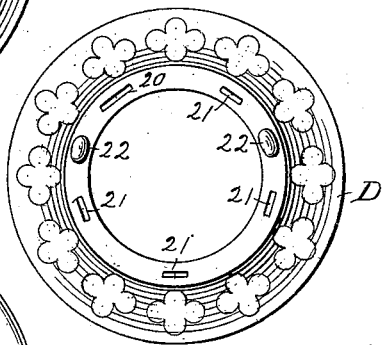
Figure 5:
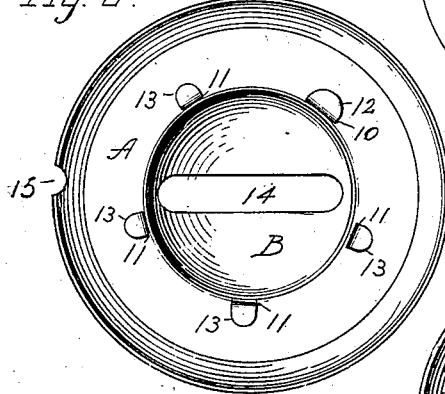
Figure 7:
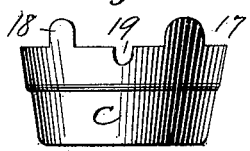
Figure 8:
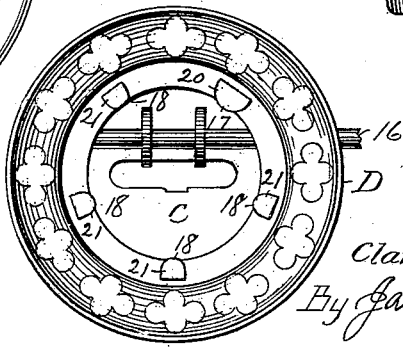

In the accompanying drawings, Figure 1 is a side elevation of my burner. Fig. 2 is an enlarged sectional view of the same on the line *x x* of Fig. 1. Fig. 3 is a detached plan view of the cone-base. Fig. 4 is a detached side elevation of the cone-dome. Fig. 5 is a reverse plan view of the cone. Fig. 6 is a detached reversed plan view of the collar top or rim. Fig. 7 is a detached side elevation of the neck of the collar, and Fig. 8 is a plan view of the complete collar before the wick-tube is attached.

As tin is much less expensive than brass, it is evident that great economy may be had by making the burner of tin. Besides this tin is for some reason a better metal than brass, as it is a better reflector of light and is more easily cleaned and kept bright.

I make the cone in two separate parts, a base and a dome, formed and divided as hereinafter described, and then secure said two parts together by means of lugs on one part passing through recesses in the other part. I also make the collar in the same way, the two parts of which are the top or rim and the neck. The general form of the complete burner is old, and I have shown the same as especially adapted for lanterns.

A designates the base of the cone, and B the dome. The base has a broad flat top, at the outer edge of which there is a depending skirt, and on the top of the base there is a slightly-elevated rim 9 around its central opening and near said rim, with several elongated perforations 10 11, the perforation 10 being a little longer than the others. The dome B has a semispherical top and slightly-tapering and substantially-vertical sides which terminate with a downwardly-facing edge having the several lugs 12 13 to fit the perforations 10 11, the lug 12 being the wider to fit the wider perforation 10, whereby in assembling the parts it is necessary to properly place the lug 12 before the several lugs can be inserted in their respective perforations. The flame-slot 14 in the dome and the notch 15 for the wick-raiser shaft 16 in the cone-base are definitely located with reference to the perforation and lugs 10 12 and therefore are properly located with reference to each other when the said two parts are assembled. After passing the lugs 12 13 through the perforations 10 11 and properly seating the dome B on the base A, with its vertical sides fitting and shutting over the elevated rim 9, the lugs are clenched or bent over on the inside, as shown in Fig. 5, thereby forming the complete cone substantially of an ordinary form, only it is made of two pieces of tin instead of a single piece of brass. I make the collar in like manner, C designating the collar neck or base, and D its top or rim. The top edge of the collar C is provided with lugs 17 18, the lug 17 being the wider one, and with two open notches or recesses 19 for receiving the wick-raiser shaft, said notches being to one side of the center, so that the wick-raiser shaft received therein will be to one side of and entirely free from the wick-tube 24, as shown in Figs. 2 and 8. The top or rim of the collar D is provided with perforations 20 21 to receive the lugs 17 18, the perforation 20 being the longer one. When the collar is notched, as at 19, to receive the wick-raiser shaft 16, I strike up two bosses 22 to partly fill the mouth of the recesses 19 and serve as a bearing-surface for the upper side of the shaft 16. The said notches and confronting part of the collar constitute the bearings that furnish the entire support for the wick-raiser shaft, although said shaft passes through the notch 15 in the skirt of the dome-base. The lugs 17 18 are passed through the perforations 20 21 and then clenched or bent over to hold the two parts together, as shown in Figs. 1 and 8. I secure the head or handle 23 to the wick-raiser shaft before assembling the parts and then merely drop said shaft sidewise into said recesses, place the top on the neck or collar D, and bend the lugs to secure the said two parts together, after which the wick-tube 24 may be put in place and secured. This effects a material saving in the cost of assembling the parts in addition to the other advantages herein before referred to, inasmuch as the wick-raiser shaft does not have to be passed endwise through its bearings.

I claim as my invention—

In a lamp-burner, the combination of the collar made in two parts C, D, the wick-tube 24 mounted in the part D of said collar, and the wick-raiser shaft 16, the under face of said part D serving as bearing-faces for the said wick-raising shaft and the said part C of the collar having the two notches 19 in its edge made in line with each other to one side of said wick-tube and of a depth about equal to their width and to the diameter of the said shaft whereby the said shaft may be dropped laterally into its bearings in assembling the parts, substantially as described.

CLARENCE A. TAPLIN.

Witnesses:
JAMES SHEPARD,
A. W. STIPEK.